United States Patent [19]

Galie et al.

[11] Patent Number: 4,886,988

[45] Date of Patent: Dec. 12, 1989

[54] UNIVERSAL STEPPING MOTOR/GEAR TRAIN MODULE FOR A WRIST INSTRUMENT

[75] Inventors: Louis M. Galie, Sandy Hook, Conn.; Adolf Sedlak, Wurmberg; Gerhard Stotz, Niefern, both of Fed. Rep. of Germany

[73] Assignee: Timex Corporation, Middlebury, Conn.

[21] Appl. No.: 250,184

[22] Filed: Sep. 28, 1988

[51] Int. Cl.[4] ...................... H02K 37/00; G04C 10/00

[52] U.S. Cl. .................................... 310/49 R; 310/71; 368/64

[58] Field of Search ................. 310/71, 49 R; 368/10, 368/48, 64, 204, 223

[56] References Cited

U.S. PATENT DOCUMENTS 4,143,507 3/1979 Ganter et al. .......................... 368/34
4,236,240 11/1980 Yoshida ................................ 368/76

FOREIGN PATENT DOCUMENTS 3346388 7/1985 Fed. Rep. of Germany ........ 368/48
0267688 11/1987 Japan .................................. 368/204

*Primary Examiner*—Patrick R. Salce
*Assistant Examiner*—Judson H. Jones
*Attorney, Agent, or Firm*—William C. Crutcher

[57] ABSTRACT

The invention comprises a universal stepping motor/gear train module for a wrist instrument having a frame plate, a bridge plate attached thereto and spaced therefrom, a stepping motor comprising rotor and stator disposed between said plates, a reduction gear train having gear members coupled to be driven by the rotor and having coaxial output members adapted to receive analog hands, an input/output circuit board disposed in said frame plate and having a pair of power supply terminals thereon, said frame plate defining a recess large enough to receive at least a portion of a button energy cell, and first and second spring contact connectors having ends adapted to contact the terminals of the energy cell and extending between the recess and the power supply terminals on the input/output circuit board, whereby power may either be supplied to said board directly from said power supply terminals or from said energy cell. The input/output circuit board includes other terminals for driving connection to the stepping motor, and for oscillator, switching, etc.

14 Claims, 5 Drawing Sheets

UNIVERSAL STEPPING MOTOR/GEAR TRAIN MODULE FOR A WRIST INSTRUMENT

BACKGROUND OF THE INVENTION

This invention relates generally to wrist instruments with analog hands driven by a stepping motor and gear train and carrying out timekeeping as well as other functions. More particularly, the invention relates to a universal stepping motor/gear train module for use in a combined function wrist instrument.

Electronic wristwatches are well known which have analog hands driven by a stepping motor through a speed reducing gear train. Such watches always include as part of the movement a printed circuit board which serves as a mounting platform and interconnects necessary electrical components including an integrated circuit, quartz crystal, and various discrete components such as transistors and capacitors. The movements also generally include provision for insertion of a button-type energy cell and spring contact switches which are connected to terminals on the circuit board.

It has also been proposed that quartz analog watches include provision for digital timekeeping and to include a digital opto-electric display in combination with the analog hand display, this being sometimes called a "combo" watch. An example of a combo watch is seen in U.S. Pat. No. 4,236,240 in which stepping motor and gear train are assembled at an eight o'clock location in a recess of a support frame, and wherein a circuit board is disposed elsewhere in the movement in the same plane with liquid crystal display on side and an energy cell on the other. The stepping motor and gear train, together with time setting stem, are assembled piece by piece at the time the overall movement is assembled.

Watches have also been proposed in combination with calculators, radio transmitters, radio receivers, thermometers, and many other electronic devices, some of which use elements in common with the elements of an electronic watch and all of which occupy space inside the case of the wrist instrument.

It would be desirable to provide a universal stepping motor/gear train module of minimum size which is preassembled and especially adapted for connection to other devices which are disposed inside the case of the wrist instrument.

It would also be desirable to provide such a universal module adapted to use different sizes of energy cells or to receive power from an external source. It would also be desirable to provide such a universal module with a manual crown for setting the hands and to provide that the hands be driven either by external or internal electronic impulses.

It would also be desirable to provide such a module which is easily adapted to a self-contained timekeeping quartz analog watch, to a combo watch, or to a analog indicator for time or another condition to be displayed.

Accordingly, one object of the present is to provide an improved universal stepping motor/gear train module of minimum size and with a minimum number of components.

Another object of the invention is to provide such a universal module which is preassembled and especially adapted to occupy only a portion of a case of a wrist instrument along with other electronic devices connected thereto.

SUMMARY OF THE INVENTION

Briefly stated, the invention comprises a universal stepping motor/gear train module for a wrist instrument having a frame plate, a bridge plate attached thereto and spaced therefrom, a stepping motor comprising rotor and stator disposed between said plates, a reduction gear train having gear members coupled to be driven by the rotor and having coaxial output members adapted to receive analog hands, an input/output circuit board disposed in said frame plate and having a pair of power supply terminals thereon, said frame plate defining a recess large enough to receive at least a portion of a button energy cell, and first and second spring contact connectors having ends adapted to contact the terminals of the energy cell and extending between the recess and the power supply terminals on the input/output circuit board, whereby power may either be supplied to said board directly from said power supply terminals or from said energy cell. The input/output circuit board includes other terminals for driving connection to the stepping motor, and for oscillator, switching, etc.

DRAWINGS

Other objects and advantages may be seen from the following description, taken in connection with the accompanying drawings, wherein.

DESCRIPTION OF THE PREFERRED EMBODIMENT

Figure 1:
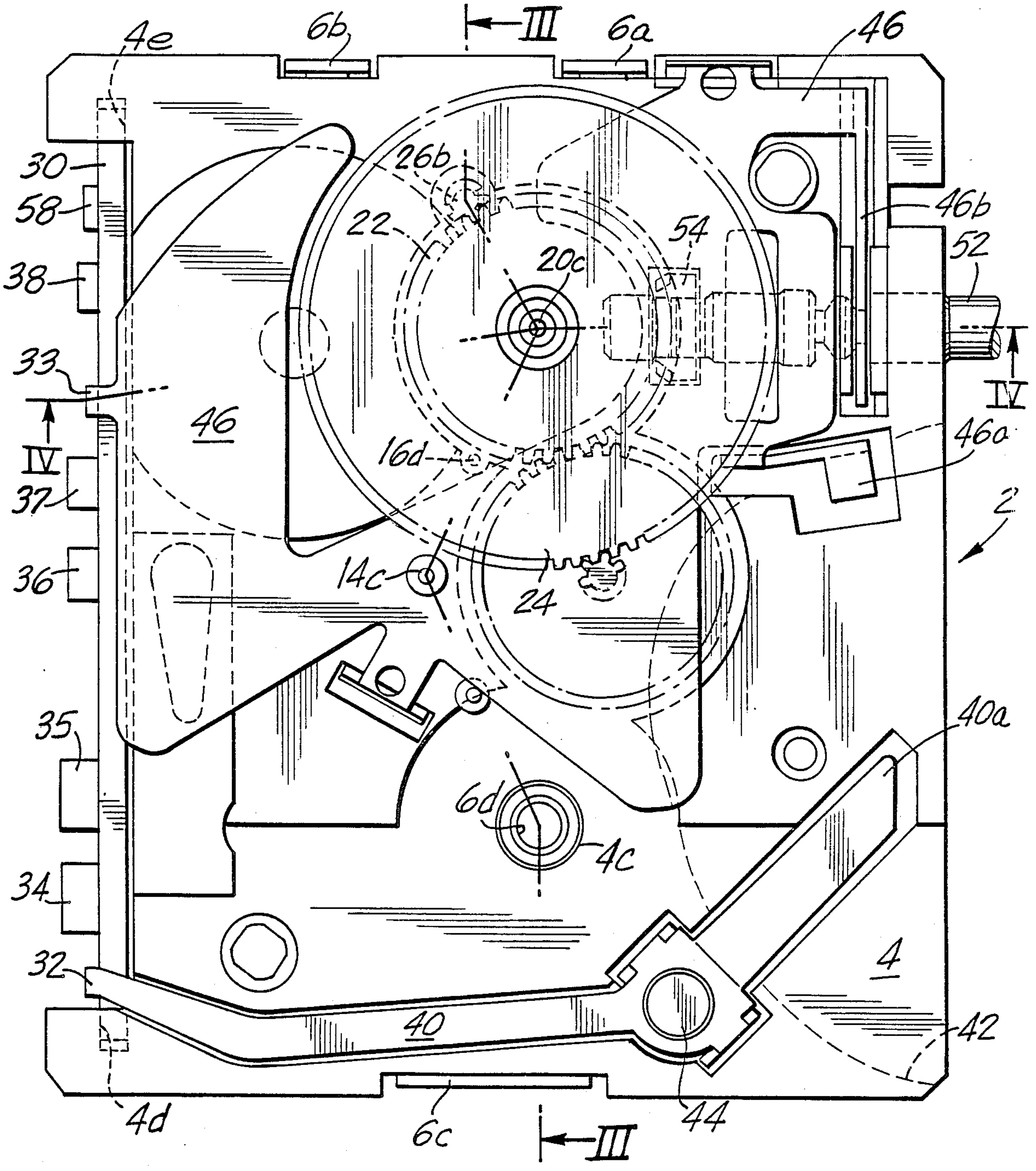
FIG. 1 is a top plan view of the improved universal stepping motor/gear train module.

Referring now to FIG. 1 of the drawing, a universal stepping motor/gear train module, shown generally as 2 comprises a substantially rectangular frame plate 4 of nonmagnetic material such as plastic, which serves as the basic structural member of the module and contains a number of holes serving as journal bearings for gear train members.

Figure 2:
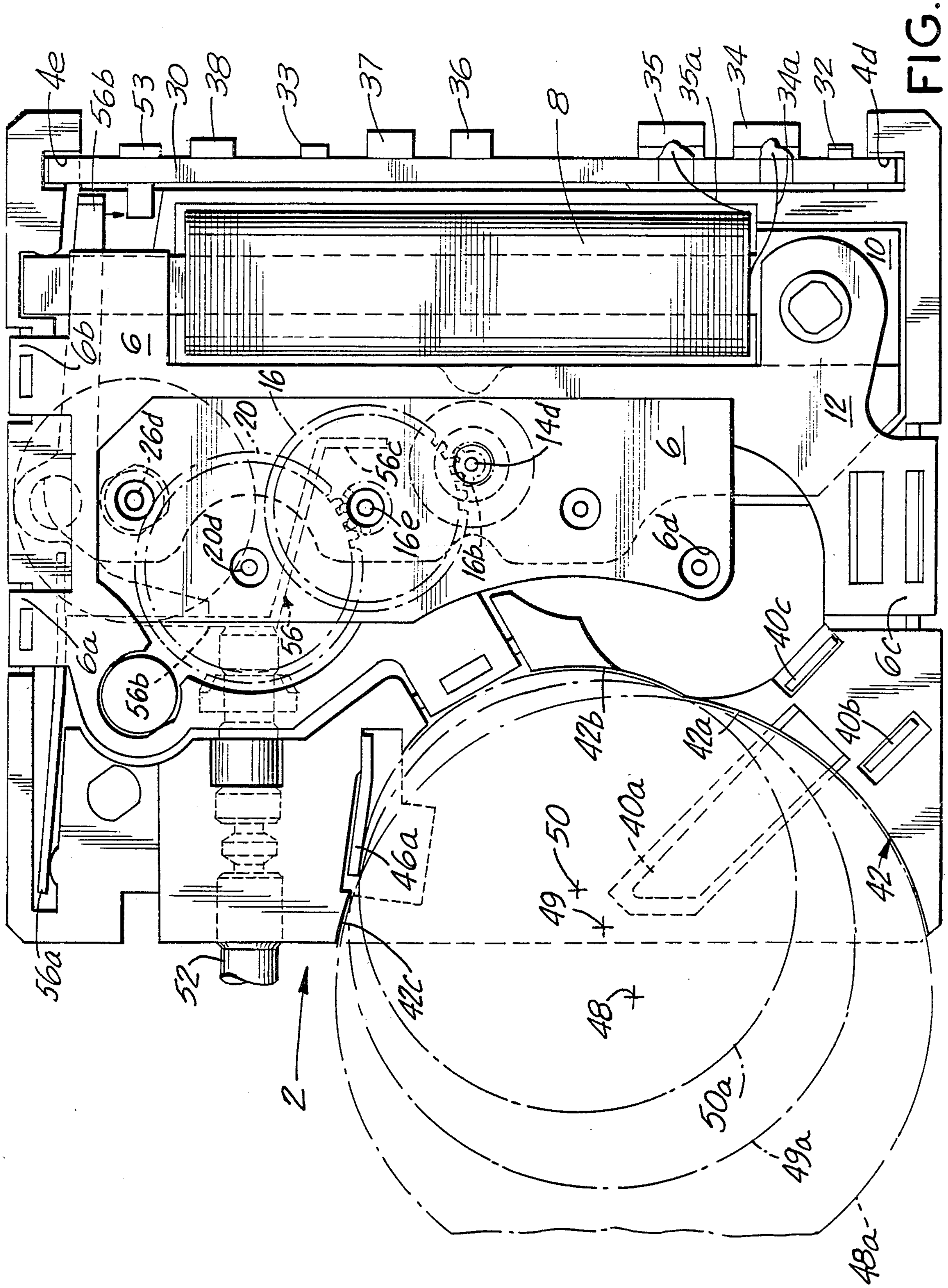
FIG. 2 is a bottom plan view thereof.

Referring to FIG. 2 of the drawing, which is the bottom plan view of the module, a bridge plate 6 spans the frame plate and is spaced therefrom. Bridge plate 6 contains holes which serve as journal bearings for the opposite ends of the rotating gear members, and is fixed to the frame plate 4 by means of hooks 6*a*, 6*b*, and 6*c* which snap into recesses in the frame plate.

Figure 3:
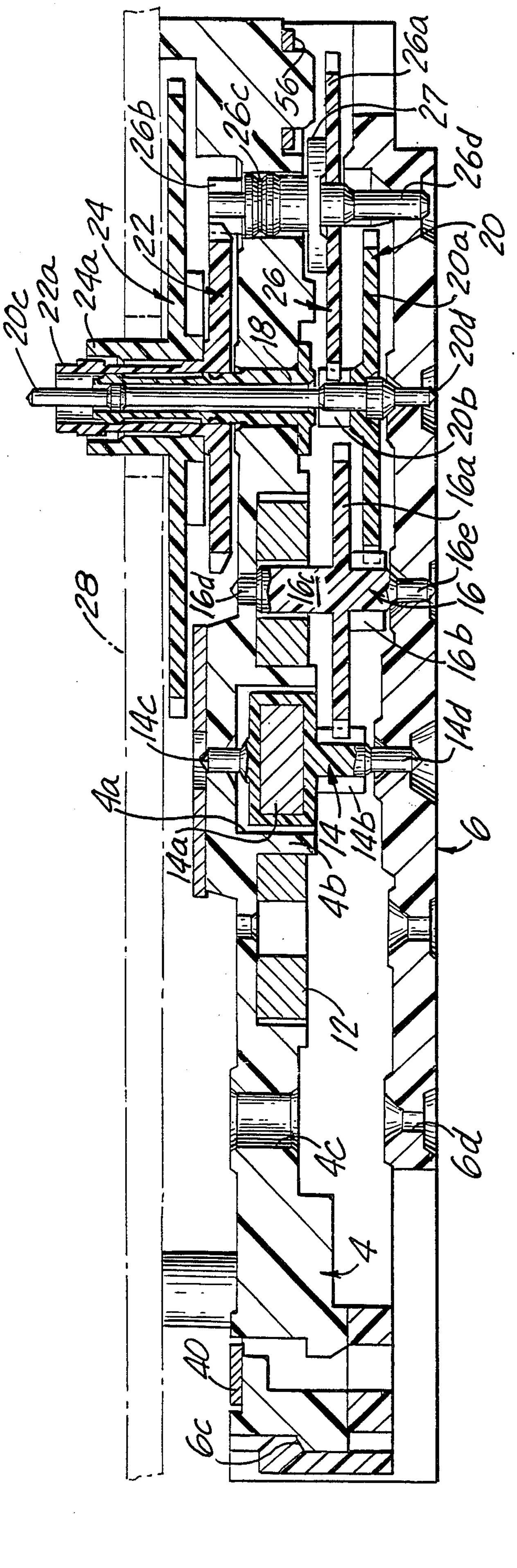
FIG. 3 is a developed elevation view thereof in cross-section taken along lines III—III of FIG. 1.
Figure 4:
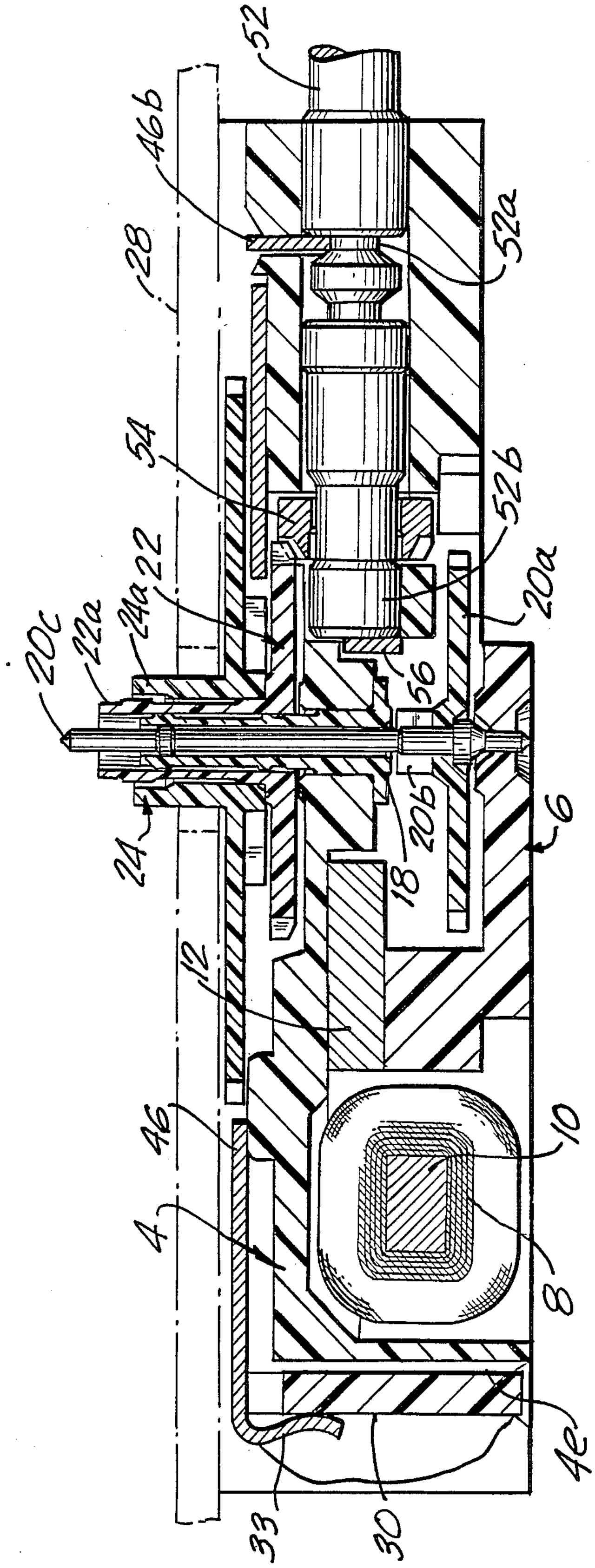
FIG. 4 is an end elevation in section taken along lines IV—IV of FIG. 1.

Referring to the cross-sectional drawings of FIGS. 3 and 4, the frame plate and bridge plate are seen to enclose between them a stepping motor comprising a coil 8, coil core 10, and stator 12, and a rotor 14. Rotor 14 includes a bipolar permanent magnet 14*a*, gear pinion 14*b*, and opposed stems 14*c*, 14*d* journaled in holes in the frame plate and bridge plate respectively (see FIGS. 1 and 2). Rotor 14 is disposed within a cylindrical well 4*a* in the frame formed by a cylindrical wall 4*b* which extends through the air gap between rotor 14 and stator 12.

An intermediate wheel assembly 16 of plastic material has a gear wheel 16a meshing with pinion 14b, a pinion 16b, an extension 16c passing through a hole in the stator of the stepping motor, and opposed stems 16d, 16e journaled in the frame plate and bridge plate respectively.

A number of coaxial rotatable output members adapted to receive the hands of the timepiece (not shown) are journaled by means of a fixed center post 18 held in frame plate 4. Center post 18 is hollow and journals on its interior a second wheel assembly 20, having a "seconds" gear wheel 20a meshing with pinion 16b, a pinion 20b and a seconds shaft 20c adapted to receive a seconds hand. Journaled on the exterior of center post 18 is a center wheel 22 with a coaxial sleeve 22a adapted to receive a "minutes" hand (not shown). Coaxially journaled about sleeve 22a is a hour wheel 24 with a coaxial sleeve 24a adapted to receive "hours" hand (not shown). Seconds shaft 20c, sleeve 22a, and sleeve 24a are coaxial output members.

A third wheel assembly 26 includes a third wheel gear 26a meshing with pinion 20b, a pinion 26b meshing with center wheel 22, a ring flange 26c journaled in the frame, and a stem 26d journaled in the bridge plate. A frictional slip clutch 27 permits pinion 26b to turn when wheel 26a is locked, as will be explained later.

The foregoing members comprise a stepping motor and a reduction gear train driven by the rotor of the stepping motor and having coaxial output members adapted to receive hands. Such a stepping motor and gear train is present in any quartz analog timepiece, but in accordance with the present invention is provided in a preassembled module of minimum size and arranged to fit below a much larger dial 28, portions of which are shown in phantom lines in FIGS. 3 and 4.

It will be noted that there are a number of unoccupied journal bearing holes, such as 4c, 6d in the frame plate and bridge plate which are not used in the gear train. These holes is not material to the present invention, since they are used for an additional gear train in keeping with the universal nature of the module.

In accordance with the present invention, and in place of the usual printed circuit board, an input/output board 30 is set perpendicular to the frame in opposed slots 4d, 4e. Input/output board 30 has a number of terminals on it which are adapted to receive external wiring connections. These include a pair of power supply terminals 32, 33, a pair of stepping motor input terminals 34, 35, a pair of time base input terminals 36, 37, and switching input terminals, one of which is seen at 38. Other terminals might be included to interface with discrete components which may be required for particular applications.

The power supply terminals 32, 33 are tabs formed on the ends of spring contact connectors, which extend across the frame plate to also serve as contacts with an energy cell, which may or may not be used with the module. Referring to FIG. 1 of the drawing, the power supply terminal 32 comprises one end of a spring contact connector 40, which has a terminating contact tab 40a, extending into the bottom of an energy cell recess 42. The spring contact connector is held in place by a post 44 which is integral with frame 4, and a pair of tabs 40c, 40b extending into slots of the frame on either side of the post.

In a similar manner, the power supply terminal 33 is part of a larger spring contact connector comprising a holding plate 46, which performs a great many functions, but pertinent to the present discussion includes a spring contact tab 46a extending into the battery recess 42. Another portion 46b of the holding plate serves as a detent spring. The spring tabs 40a, 46a function in the manner of normal spring contact tabs to make connection with the positive and negative terminals of a button-type energy cell when it is inserted into recess 42.

In keeping with the present invention for providing a minimum module size, recess 42 is large enough to receive only a portion of an energy cell, since in some cases the module will be operated without an energy cell. Recess 42 is also laid out in such a way as to accommodate varying diameter energy cells. In order to do this, the wall of recess 42 comprises arcuate sections 42a, 42b, 42c with two different radii locating three different cell centers, such as 48, 49, 50. The phantom line circles 48a, 49a, 50a indicate how these varying diameter energy cells are accommodated within recess 42 and make contact with the spring contact terminals 40a, 46a.

The pair of stepping motor terminals 34, 35 on the input/output board 30 are connected directly to the stepping motor coil 8 by leads 34a, 35a. They may be employed to direct external drive impulses to the coil to advance the hands, whether used for timekeeping or to display some other function.

The time base input terminals 36, 37 may be employed to either supply an external time base connection from the board 30 with mounted integrated circuit, quartz crystal and oscillator capacitors to a separate device or to connect the board 30 with mounted integrated circuit to external quartz crystal and external oscillator capacitors which may optionally be mounted also on the board 30. Similarly, the switching terminal 38, which is representative of other switching terminals as well, is employed either to connect to a manual actuator on the wrist instrument or to introduce an external switching signal.

The universal module also includes a manual setting stem 52, which is both rotatable and slidable within frame plate 4, and held by spring portion 46b in detent grooves 52a. Loosely disposed on stem 52 is a setting pinion having teeth engaged with center wheel 22 at all times. Stem 52 includes a terminating section 52b which has a diameter such that it will frictionally engage the interior of setting pinion 54 when the stem 52 is pulled out. The end of stem portion 52b also engages a stop lever 56 and holds it against the bias of a spring finger 56a. Stop lever 56 also includes a spring contact switching portion 56b and a shaft rotation stop portion 56c. A pin stop 58 in board 30 both physically stops the stop lever 56, as well as makes electrical contact. Operation of the stop lever is such that when the stem 52 is pulled out, the setting pinion 54 frictionally engages the stem and allows rotation of the stem to set the hands. At the same time, stop lever 56 is released, allowing portion 56c to lock a portion of the gear train including the stepping motor rotor and the seconds wheel. The frictional slip clutch 27 allows the minute and hour hand part of the gear train to rotate.

It remains to note that the coaxial output members 20c, 22a, 24a are not located in the center of the substantially rectangular frame, but are located at a point substantially to one side of the center of the frame plate, i.e. approximately midway between the center thereof and one of the edges. Also, in the preferred embodiment, the stepping motor coil extends along one edge and the energy cell recess is disposed on the opposite edge, so that the gear members may be arranged with their axles in a line which runs more or less parallel to the coil of the stepping motor.

Figure 5:
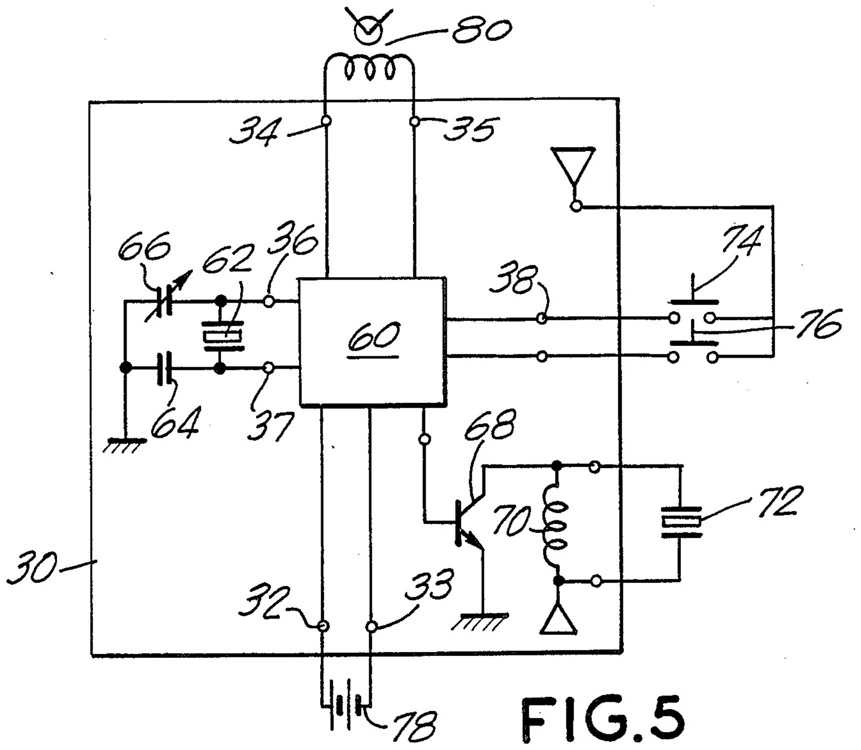
FIG. 5 is a simplified schematic diagram of an input/output board having pairs of terminals thereon connected to an integrated circuit.

FIG. 5 is a schematic representation of the input/output board 30. For a normal quartz analog watch, it would incorporate an integrated circuit 60 and various discrete electrical components mounted thereon, such as a quartz crystal timebase 62, capacitor 64, 66, and drive transistor 68 and coil 70 for an alarm. External to the board 30 would be a piezo electric crystal 72 for the alarm or annunciator, manual push button actuators 74, 76, one or more energy cells 78, and stepping motor and gear train 80. In accordance with the present invention, additional terminals 32–38 are provided on input/output board 30. The integrated circuit 60 and discrete components normally mounted on the board and shown in FIG. 5 may be partially or totally eliminated and furnished through external connections or from another electrical device inside the wrist instrument case. In the extreme case the terminals 32–38 are the only items on board 30.

Figure 6:
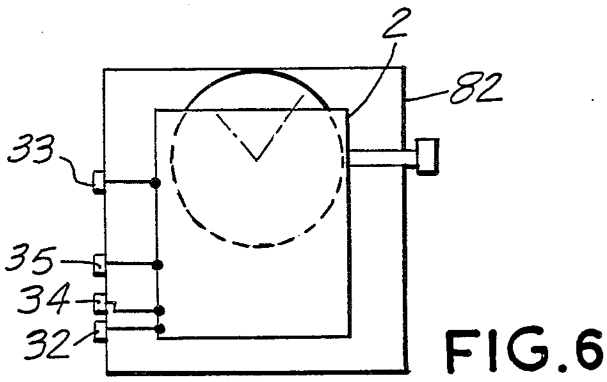
FIGS. 6, 7, and 8 are simplified schematic plan views of representative wrist instruments, which utilize the universal module in different ways.
Figure 7:
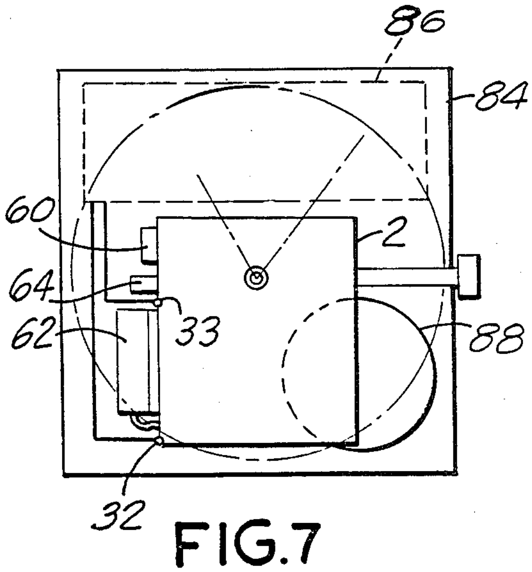
Figure 8:
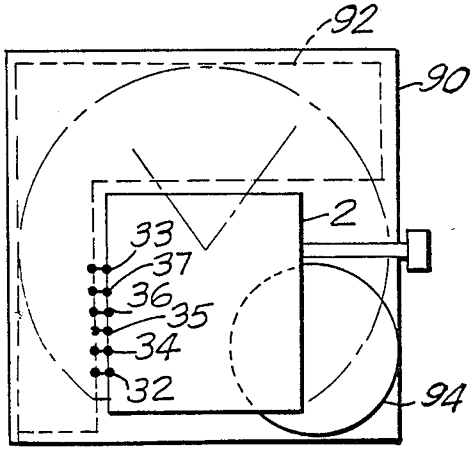

FIGS. 6–8 are representative arrangements. In FIG. 6, the module 2 is shown in a wrist instrument case 82 of minimum size. The module acts as an analog indicator for some purpose other than timekeeping such as temperature indicator. Power is supplied externally through terminals 32, 33 and stepping motor impulses which may also include reversing impulses are supplied externally through terminals 34, 35.

In FIG. 7, module 2 is disposed within a wrist instrument case 84 along with another electrical device 86. An energy cell 88 supplies the power. Discrete components such as quartz crystal timebase 62, integrated circuit 60 and capacitor 64 are mounted on board 30. Electrical power is supplied from energy cell 88 also to the device 86 from the board terminals 32, 33.

In FIG. 8 a more complex wrist instrument is disposed in case 90, with a more complex electrical device 92 and a large energy cell 94. The larger electrical device 92 contains the necessary elements for its own function as well as those of the stepping motor/gear train. Hence, it is provided with terminals which connect directly to terminals 32–37 on the input/output board 30.

The foregoing illustrations in FIGS. 6–8 in the circuit diagram of FIG. 5 are merely intended to show representative arrangements and flexibility of the universal stepping motor/gear train module. Because of the location of the coaxial output members off center in module 2, the module may be displaced to one side in the wrist instrument case to allow room for the other electrical devices such as 86, 92 shown in FIGS. 7 and 8, while still keeping the center of the analog hands in the center of the wrist instrument.

While there is disclosed herein what is considered to be the preferred embodiment of the invention, other modifications will occur to those skilled in the art, and it is desired to secure in the appended claims all such modifications as fall within the true spirit and scope of the invention.

We claim:

1. A universal stepping motor/gear train module for a wrist instrument comprising:

a frame plate, a bridge plate attached thereto and spaced therefrom, a stepping motor comprising rotor and stator disposed between said plates, a reduction gear train having gear members coupled to be driven by said rotor and having coaxial output members adapted to receive hands, said gear members being rotatably disposed between said plates, an input/output circuit board disposed substantially perpendicular to said frame plate, and having a pair of power supply terminals, said frame plate defining a recess large enough to receive at least a portion of a button energy cell, and first and second spring contact connectors having ends adapted to contact the terminals of said energy cell, said connectors extending between said recess and said input/output circuit board, whereby power may be either supplied to said board directly from said power supply terminals or from said energy cell.

2. The combination according to claim 1, wherein said coaxial output members are disposed substantially to one side of the center of said frame plate, and wherein said input/output circuit board is disposed in a plane substantially perpendicular to those containing the frame plate and the bridge plate.

3. The combination according to claim 1, wherein said energy cell recess is adapted to accommodate portions of the circumference of cells of varying diameters.

4. The combination according to claim 1, wherein said input/output board also includes at least an integrated circuit thereon and having at least one switching terminal thereon adapted to be connected to another device in said wrist instrument, said switching terminal being also connected to said integrated circuit.

5. The combination according to claim 1 wherein said frame plate is substantially rectangular and said stepping motor has a coil extending parallel to and adjacent a first edge of said frame plate.

6. The combination according to claim 1, wherein said frame plate is substantially rectangular and said output members are located substantially midway between the center of the frame plate and a second edge thereof.

7. The combination according to claim 1, wherein at least one of said gear members extends between said plates through a hole defined in said stator.

8. The combination according to claim 1, wherein said recess defines a plurality of arcuate surfaces having different centers adapted to correspond to different diameter button cells.

9. The combination according to claim 1, wherein said input/output board has a pair of stepping motor terminals thereon and wherein said stepping motor has a coil connected directly to said pair of stepping motor terminals on the input/output circuit board, whereby another signal outside the module may be introduced to said stepping motor terminals to step the stepping motor.

10. The combination according to claim 1, wherein said frame plate is substantially rectangular, said stepping motor has a coil extending parallel to a first edge of said frame plate, said output members being located between a center of said frame plate and a second edge thereof perpendicular to said first edge, said recess being defined in a third edge opposite said first edge.

11. The combination according to claim 1, wherein a manually actuatable setting stem having detents and having an engageable setting pinion is adapted to selectively mesh with a said gear member in order to manually rotate said gear member and wherein one of said spring contact members includes a spring detent portion cooperating with said stem detents.

12. The combination according to claim 11, wherein said module further includes a spring biased stop lever having a first portion biased to frictionally contact and hold a second gear member and having a second portion responsive to movement of said stem for activating and deactivating said first portion.

13. The combination according to claim 1, wherein said frame plate is of non-magnetic material and is substantially rectangular and wherein said bridge plate is of non-magnetic material and spans between two opposite edges of said frame plate and defines a pair of opposed spring legs adapted to hook the opposite edges of the frame plate to hold the bridge plate to the frame plate.

14. The combination according to claim 1, wherein said input/output circuit board includes an integrated circuit and a pair of time base input terminals for connection to another device in said wrist instrument, said integrated circuit a so connected to said time base input terminals.

* * * * *